(12) United States Patent
Nguyen Hoang et al.

(10) Patent No.: US 8,348,505 B2
(45) Date of Patent: Jan. 8, 2013

(54) SELF-CALIBRATION CIRCUIT AND METHOD FOR JUNCTION TEMPERATURE ESTIMATION

(75) Inventors: Viet Nguyen Hoang, Leuven (BE); Pascal Bancken, Opwijk (BE); Radu Surdeanu, Roosbeek (BE); Benoit Bataillou, Lyons (BE); David van Steenwinckel, Holsbeek (BE)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 12/971,738

(22) Filed: Dec. 17, 2010

(65) Prior Publication Data

US 2011/0150028 A1  Jun. 23, 2011

(30) Foreign Application Priority Data

Dec. 18, 2009 (EP) ..................... 09179980

(51) Int. Cl.
*G01K 7/00* (2006.01)
(52) U.S. Cl. ............ 374/178; 374/100; 374/163; 374/1; 374/10
(58) Field of Classification Search ............... 374/1, 10, 374/100, 163, 178
See application file for complete search history.

(56) References Cited

U.S. PATENT DOCUMENTS

| | | | |
|---|---|---|---|
| 6,149,299 A * | 11/2000 | Aslan et al. ............ 374/178 |
| 6,890,097 B2 * | 5/2005 | Tanaka ............ 374/185 |
| 7,052,180 B2 | 5/2006 | Shih | |
| 7,108,420 B1 * | 9/2006 | Schnaitter ............ 374/168 |
| 2004/0071189 A1 | 4/2004 | Tanaka | |
| 2006/0280224 A1 * | 12/2006 | Shih ............ 374/178 |
| 2008/0061865 A1 * | 3/2008 | Koerner ............ 327/512 |

FOREIGN PATENT DOCUMENTS

| GB | 2 369 437 A | 5/2002 |
|---|---|---|
| WO | 2009/095853 A2 | 8/2009 |

OTHER PUBLICATIONS

Author: Jason Chonko, Title: "Using Forward Voltage to Measure Semiconductor Junction Temperature", Date: Feb. 2006, Publisher: Keithley Instruments, Inc., pp. 1-3, URL: www.keithley.com/data?asset=50486.*
Extended European Search Report for Patent Appln. No. 09179980.9 (Jun. 29, 2010).

* cited by examiner

*Primary Examiner* — Lisa Caputo
*Assistant Examiner* — Roger Hernandez-Prewitt

(57) ABSTRACT

The present invention relates to a calibration circuit, computer program product, and method of calibrating a junction temperature measurement of a semiconductor element, wherein respective forward voltages at junctions of the semiconductor element and a reference temperature sensor are measured, and an absolute ambient temperature is determined by using the reference temperature sensor, and the junction temperature of the semiconductor element is predicted based on the absolute ambient temperature and the measured forward voltages.

9 Claims, 2 Drawing Sheets

SELF-CALIBRATION CIRCUIT AND METHOD FOR JUNCTION TEMPERATURE ESTIMATION

This application claims the priority under 35 U.S.C. §119 of European patent application no. 09179980.9, filed on Dec. 18, 2009, the contents of which are incorporated by reference herein.

FIELD OF THE INVENTION

The present invention relates to a calibration circuit, method and computer program product for calibrating a junction temperature measurement of a semiconductor element, such as—but not limited to—a light emitting diode (LED).

BACKGROUND OF THE INVENTION

High intensity LEDs are becoming more popular as light sources for traffic lights, automobile interior and exterior lighting, signboards, and other applications. The light output of a silicon LED chip is not only a function of the chip size and the process, but also a function of the junction temperature of the LED. By keeping the junction temperature low, LEDs can be driven with twice or three times as much current and, thus, generate twice or three times the light output while still extending the life of the LEDs.

Junction temperature affects LED and laser-diode performance in many ways. Light output center wavelengths, spectrum, power magnitude, and diode reliability are all directly dependent on the junction temperature. Thus, thermal design of the diode itself and the packaging in which it is encased becomes crucial to the overall performance of the device. Validation of thermal design and assembly repeatability requires the ability to measure junction temperature.

LED performance can be accurately controlled if the temperature $T_{junction}$ at the LED junction is known. The junction temperature $T_{junction}$ of a LED can be determined based on the forward voltage $V_f$ of the LED at a small drive current (in the order of e.g. 10 µA) using the following equation:

$$T_{junction} = T_{Ref} + (V_{f\_measured} - V_{f\_Ref})/T_{Coeff} \quad (1)$$

where $T_{Ref}$ (° C.) is the reference temperature, $V_{f\_Ref}$ (V) is the forward voltage of the LED at the reference temperature and at the same drive current, and $T_{Coeff}$ (V/° C.) is the temperature coefficient, which relates the change in LED forward voltage to the change in its junction temperature.

FIG. 2 shows a diagram illustrating the relation between the forward voltage $V_f$ and the junction temperature $T_{junction}$ of an exemplary LED. From the linear relationship depicted in FIG. 2, it is clear that to be able to determine the junction temperature of a LED accurately, one must know the values of the reference temperature $T_{ref}$, the forward voltage $V_{f\_ref}$ and the temperature coefficient $T_{Coeff}$. These parameters can be determined beforehand for a type of LED in laboratory condition. However, this predetermination of reference values add cost, effort and complexity to LED or LED fixture manufacturers.

The U.S. Pat. No. 7,052,180 discloses an LED junction temperature tester which measures the LED junction temperature directly by taking advantage of the linear relationship between the forward current driven through the LED, the forward voltage of the LED, and the junction temperature, to determine the LED junction temperature. Calibration is conducted by placing two LEDs from the same family in ambient temperature and passing a small test current through each of the LEDs to obtain the forward voltage of the LED at ambient temperature. The LED under test is then placed in an environmentally-controlled chamber where the temperature is raised a known amount above ambient temperature. Known low and high voltage values are associated with the ambient temperature and the environmental chamber temperature, causing the LED under test to become a calibrated thermometer than can measure its own junction temperature due to the linear relationship between the forward voltage and the junction temperature.

SUMMARY OF THE INVENTION

It is an object of the present invention to provide a calibrating circuit and method to be used with semiconductor elements, such as LEDs, for accurate and fast junction temperature measurement.

In a first aspect of the present invention a method of calibrating a junction temperature measurement of a semiconductor element is presented that comprises:
measuring respective forward voltages at junctions of said semiconductor element and a reference temperature sensor;
determining an absolute ambient temperature by using said reference temperature sensor; and
predicting said junction temperature of said semiconductor element based on said absolute ambient temperature and said measured forward voltages.

In a further aspect of the present invention a calibration circuit for calibrating a junction temperature measurement of a semiconductor element is presented, that comprises:
a reference temperature sensor for measuring an absolute ambient temperature;
voltage measurement means for measuring forward voltages at respective junctions of said semiconductor element and said reference temperature sensor (35); and
prediction means for predicting said junction temperature of said semiconductor element based on said absolute ambient temperature and said measured forward voltages.

Preferred embodiments of the invention are defined in the dependent claims. It shall be understood that the features of claim 1 and the features of claim 9 have similar and/or identical preferred embodiments as defined in the dependent claims.

Accordingly, a calibration-free LED driver with accurate and fast LED junction temperature measurement capability can be provided, wherein driver integrated circuits (ICs) can be made independent from LED type manufacturers as well as from LED age and/or properties variations. The junction temperature can be predicted from the measured absolute ambient temperature and the measured forward voltages at the semiconductor element and the reference temperature sensor.

The determination may comprise a direct measurement of the absolute ambient temperature based on a proportional-to-absolute temperature measurement principle.

Additionally, the measuring and determining steps may be performed at least two different ambient temperatures during a calibration phase of the semiconductor element. In a specific example, the calibration phase may be provided during an off-time of the semiconductor element.

The reference voltage temperature sensor may be arranged at a place with substantially the same ambient temperature as the semiconductor element. In a specific example the reference temperature sensor may be arranged in a calibration circuit of the semiconductor element (e.g. LED).

The reference temperature sensor may comprise a diode.

Additionally, a current source may be provided for generating a measurement current to be provided to said semiconductor element and said reference temperature sensor to allow direct measurement of said absolute ambient temperature based on a proportional-to-absolute temperature measurement principle.

Furthermore, the calibration circuit may be adapted to provide the forward voltages and the absolute ambient temperature at least two different ambient temperatures.

The calibration circuit may be arranged as a single chip or a chip set provided separately to the semiconductor element or integrated with a semiconductor element on the same chip or chip set.

Furthermore, the calibration circuit may comprise a microprocessor controlled by a software routine, wherein the software routine comprises code means for carrying out the above method steps when run on a computing device, such as a processor provided in the calibration circuit.

BRIEF DESCRIPTION OF THE DRAWINGS

These and other aspects of the invention will be apparent from and elucidated with reference to the embodiment(s) described hereinafter. In the following drawings

DETAILED DESCRIPTION

The present invention is further elucidated by the following figures and examples, which are not intended to limit the scope of the invention. The person skilled in the art will understand that various embodiments may be combined.

Figure 1:
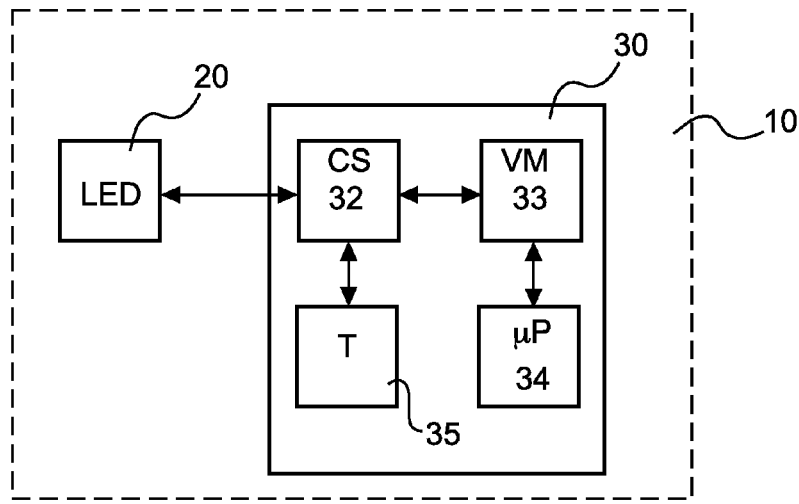
FIG. 1 shows a schematic block diagram of a calibration system according to an embodiment.

FIG. 1 shows a schematic block diagram of a self-calibrating circuit 30 according to an embodiment. The self-calibrating circuit 30 is connected to an LED 20 so as to control the calibration process. An automatic calibration of the LED 20 for temperature sensing is achieved by using a standard, build-in temperature sensor 35 in the calibration circuit 30. The dashed box, drawn around the LED 20 and the calibration circuit 30, indicates a common ambient environment 10, which ensures that the LED 20 and the calibration circuit 30 are substantially at the same temperature.

Additionally, the calibration circuit 30 includes a current source (CS) 32, a voltage measurement block (VM) 33, and a microcontroller or microprocessor (µP) 34 with embedded memory to store measured reference values. The current source 32 is configured to provide measurement currents to the LED 20 and to the reference temperature sensor (T) 35 which may be a diode for example. If a diode is used as the reference temperature sensor 35, a direct measurement of absolute ambient temperature is allowed based on a proportional-to-absolute temperature (PTAT) measurement principle according to the following equation:

$$T = \frac{q(V_{diode1} - V_{diode2})}{k \ln \frac{I_{diode1}}{I_{diode2}}} \quad (2)$$

where q is the magnitude of electronic charge, k is the Boltzmann's constant, and I, V are the current going through the diode and the diode forward voltage, respectively. In some cases, a non-ideal factor n with a value between 1 and 2 can be introduced to compensate for non-ideal behaviour of the reference temperature sensor 35 (e.g. a diode). Using a diode as reference temperature sensor 35 can be advantageous to reduce cost of the calibration circuit 30.

The physical distance between the calibration circuit with build-in reference temperature sensor 35 and the LED 20 may introduce a substantial error in temperature measurement at the LED junction and the measurement speed may often be very low. By calibrating the LED 20 itself for temperature measurement, the LED junction temperature can be measured accurately and at very high speed.

Figure 2:
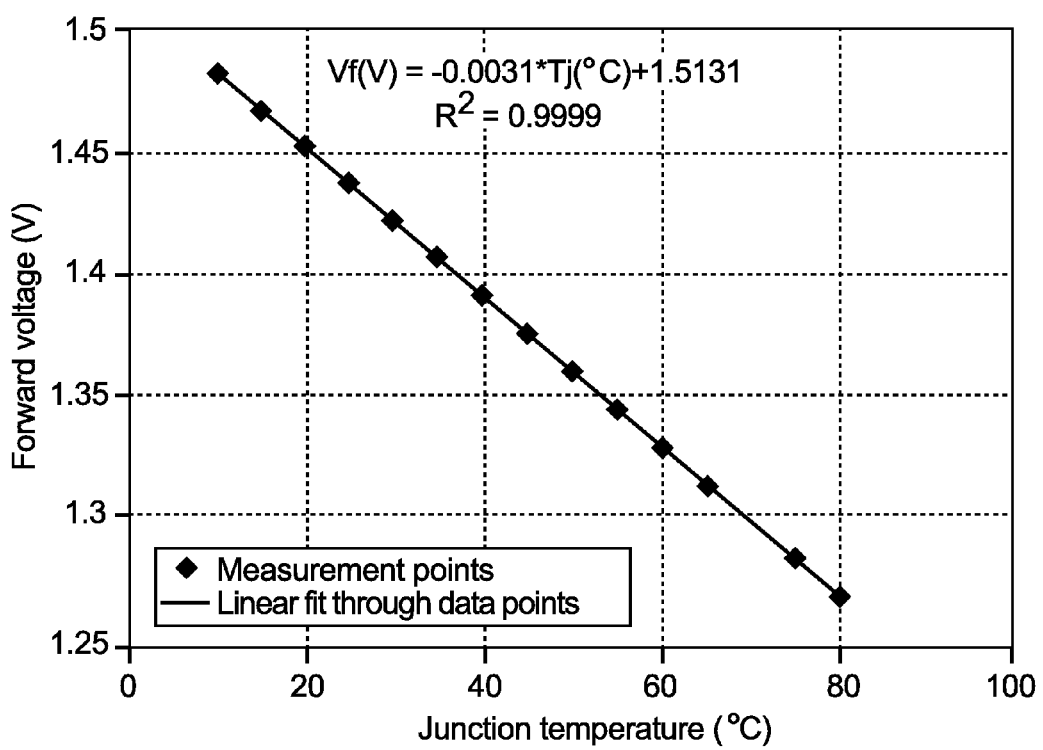
FIG. 2 shows a diagram indicating an example of a forward voltage as a function of an LED junction temperature.

The current source 32 generates measurement currents and supplies the currents to the LED 20 and the reference temperature sensor 35, while the voltage measurement block 33 measures the respective forward voltages generated at the LED 20 and the reference temperature sensor 35 and supplies the measurement values or parameters to the microprocessor 34. Based on the measurement currents and the forward voltages, the absolute ambient temperature can be calculated based on the above equation (2), wherein the first diode (diode 1) corresponds to the LED 20 and the second diode (diode 2) corresponds to the reference temperature sensor 35, or vice versa. Having knowledge of the absolute ambient temperature, and the forward voltages at the LED 20 and the reference temperature sensor 35, a junction temperature $T_{junction}$ at the LED 20 can be calculated or estimated based on the above equation (1) assuming the relation depicted in FIG. 2.

Figure 3:
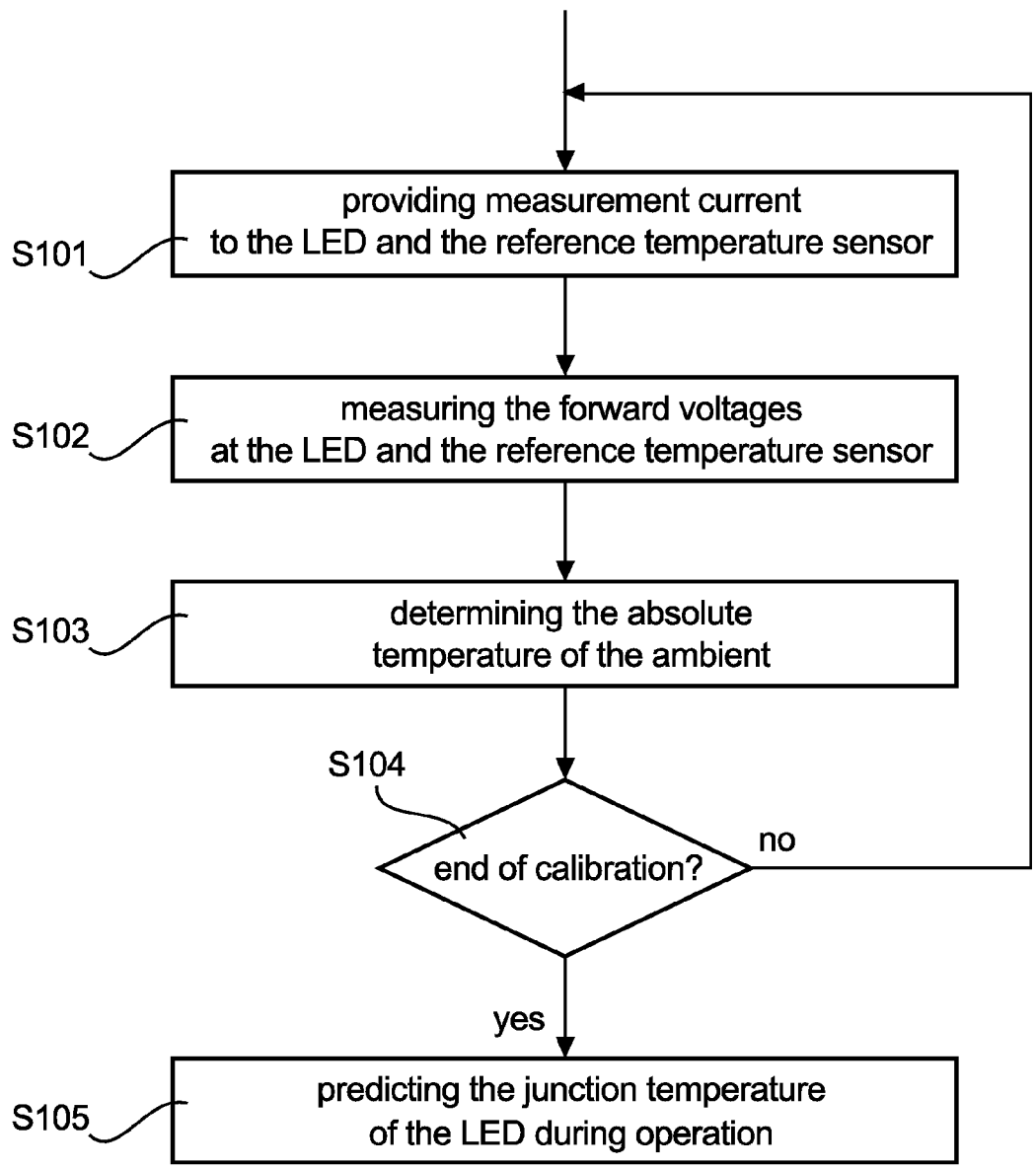
FIG. 3 shows a schematic flow diagram of a calibration procedure according to the embodiment.

FIG. 3 shows a schematic flow diagram of a calibration processing according to the embodiment.

In step S101, a measurement current is provided to the LED 20 and the reference temperature sensor 35. Then, in step S102, the forward voltages at the LED 20 and the reference temperature sensor 35 are measured by the voltage measurement block 33, and the values of the measurements and the measured forward voltages are supplied to the microprocessor 34. Based on a control program which might as well control the whole calibration procedure of FIG. 3, the microprocessor 34 determines the absolute temperature of the ambient in step S103 based on a PTAT measurement principle, e.g., using the above equation (2).

In step S104 it is checked whether the end of calibration has been reached or not. If not, steps S101 to S103 are repeated until enough measurement values are available for calibration.

Knowing the ambient temperatures and matching LED forward voltages, all reference values for accurate predicting of the LED junction temperature during operation can be derived. More specifically, the calibration measurements (e.g. steps S101 and S102) can be done at least two different ambient temperatures, while the temperature of the LED 20 should be the same as the ambient temperature, which is indicated by the dotted block in FIG. 1. The first requirement can be fulfilled relatively easy, as the temperature of an unconditioned environment varies over time (e.g. day and night time). Even in a conditioned environment, the temperature fluctuation often occurs, albeit with a smaller difference. To fulfill the above second requirement, the LED 20 should not be in an operating mode during calibration and depending on the thermal resistance between the LED junction and the environment, the off-time of the LED 20 before any measurement takes place should be sufficiently long. In view of the fact, that usually not all LED fixtures are constantly on, calibration measurement periods can be easily introduced. Even for an LED fixture that requires to be on continuously, a brief off moment for calibration to take place can still be introduced at a suitable timing.

When enough measurement values have been obtained in steps S101 to S103 of FIG. 3, end of calibration is decided in step S104 and the junction temperature of the LED 20 can be predicted in step S105 during operation.

It is noted that the above embodiment is not limited to the above calibration circuit for LEDs. It can be implemented in stand-alone temperature sensing chips for LEDs or in any other semiconductor circuitry that requires information on a junction temperature of a semiconductor element. The embodiments may thus vary within the scope of the attached claims.

The steps S101 to S105 of FIG. 3 may be implemented by a corresponding software routine or control program adapted to control the microprocessor 34 or another control processor provided at the calibration circuit 30 to perform these steps when run thereon so as to control the respective blocks of the calibration circuit to implement the calibration procedure.

In summary, the present invention relates to a calibration circuit, computer program product, and method of calibrating a junction temperature measurement of a semiconductor element, wherein respective forward voltages at junctions of the semiconductor element and a reference temperature sensor are measured, and an absolute ambient temperature is determined by using the reference temperature sensor, and the junction temperature of the semiconductor element is predicted based on the absolute ambient temperature and the measured forward voltages.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single item or other unit may fulfill the functions of several items recited in the claims. The mere fact that certain measures are recited in mutually different dependent claims does not indicate that a combination of these measures cannot be used to advantage.

The computer program product may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method of determining a junction temperature of a semiconductor element, said method comprising:
   within a calibration circuit, performing a calibration phase at at least two different ambient temperatures, the calibration phase comprising:
   generating measurement currents and supplying them to the semiconductor element and to a reference temperature sensor which comprises a diode;
   measuring the forward voltage at a junction of said semiconductor element and measuring the forward voltage at a junction of the reference temperature sensor; and
   determining an absolute ambient temperature based on a proportional-to-absolute temperature measurement principle using voltage measurements from the semiconductor element and the reference temperature sensor; and
   determining said junction temperature of said semiconductor element based on said absolute ambient temperatures and said measured forward voltages.

2. A method according to claim 1, further comprising providing said calibration phase during an off-time of said semiconductor element.

3. A method according to claim 1, further comprising arranging said reference temperature sensor at a place with substantially the same ambient temperature as said semiconductor element.

4. A method according to claim 3, further comprising arranging said reference temperature sensor in a calibration circuit of said semiconductor element.

5. A method according to claim 1, wherein said semiconductor element is a light emitting diode.

6. A circuit for determining a junction temperature of a semiconductor element, said circuit comprising a calibration circuit adapted to perform a calibration operation at at least two different ambient temperatures during a calibration phase, the calibration circuit comprising:
   a reference temperature sensor comprising a diode;
   a current source configured to generate measurement currents and to supply the measurement currents to the semiconductor element and to the reference temperature sensor;
   a voltage measurement block configured to measure a forward voltage at a junction of said semiconductor element and to measure a forward voltage at a junction of said reference temperature sensor; and
   a microcontroller or a microprocessor configured to derive an absolute ambient temperature based on a proportional-to-absolute temperature measurement principle using voltage measurements from the semiconductor element and from the reference temperature sensor;
   wherein the determining circuit further comprises determining means for determining said junction temperature of said semiconductor element based on said absolute ambient temperatures and said measured forward voltages.

7. A circuit according to claim 6, wherein said semiconductor element is a light emitting diode.

8. A computer program product comprising non-transitory computer readable code, which, when executed by a computing device, carries out the steps of claim 1.

9. A light emitting diode (LED) driver integrated circuit (IC) for determining a junction temperature of an LED, said LED driver IC comprising a calibration circuit adapted to perform a calibration operation at at least two different ambient temperatures during a calibration phase, the calibration circuit comprising:

a reference temperature sensor comprising a diode;
a current source configured to generate measurement currents and to supply the measurement currents to the LED and to the reference temperature sensor;
a voltage measurement block configured to measure a forward voltage at a junction of said LED and to measure a forward voltage at a junction of said reference temperature sensor; and
a microcontroller or a microprocessor configured to derive an absolute ambient temperature based on a proportional-to-absolute temperature measurement principle using voltage measurements from the LED and from the reference temperature sensor and to determine the junction temperature of said LED based on said absolute ambient temperatures and said measured forward voltages.

* * * * *